United States Patent
Huang et al.

(10) Patent No.: US 11,698,959 B2
(45) Date of Patent: Jul. 11, 2023

(54) SETUP METHOD, RECOGNITION METHOD AND ELECTRONIC DEVICE USING THE SAME

(71) Applicant: GEAR RADIO ELECTRONICS CORP., Zhubei (TW)

(72) Inventors: Han-Lun Huang, Taichung (TW); Chi-Hsueh Wang, Hsinchu (TW)

(73) Assignee: GEAR RADIO ELECTRONICS CORP., Zhubei (TW)

(*) Notice: Subject to any disclaimer, the term of this patent is extended or adjusted under 35 U.S.C. 154(b) by 655 days.

(21) Appl. No.: 16/713,640

(22) Filed: Dec. 13, 2019

(65) Prior Publication Data
US 2020/0311249 A1  Oct. 1, 2020

Related U.S. Application Data

(60) Provisional application No. 62/845,893, filed on May 10, 2019, provisional application No. 62/823,678, filed on Mar. 26, 2019.

(51) Int. Cl.
*G06F 21/45* (2013.01)
*G06F 16/22* (2019.01)

(52) U.S. Cl.
CPC .............. *G06F 21/45* (2013.01); *G06F 16/22* (2019.01)

(58) Field of Classification Search
CPC .......... G06F 21/32; G06F 21/45; G06F 16/00; H04L 63/0861; H04L 9/3231
See application file for complete search history.

(56) References Cited

U.S. PATENT DOCUMENTS

| | | | | |
|---|---|---|---|---|
| 7,697,729 | B2* | 4/2010 | Howell | G06V 40/13 345/173 |
| 9,621,404 | B2* | 4/2017 | Davis | H04L 63/0861 |
| 9,876,788 | B1* | 1/2018 | Ziraknejad | G06F 21/34 |
| 9,984,276 | B2* | 5/2018 | Chin | G06V 40/1365 |
| 2009/0041313 | A1* | 2/2009 | Brown | H04R 1/1041 382/124 |
| 2010/0237991 | A1* | 9/2010 | Prabhu | G06F 21/32 340/5.83 |
| 2011/0300829 | A1* | 12/2011 | Nurmi | H04L 9/3231 455/411 |
| 2013/0127592 | A1* | 5/2013 | Fyke | G07C 9/37 340/5.53 |

(Continued)

*Primary Examiner* — Lizbeth Torres-Diaz
(74) *Attorney, Agent, or Firm* — Innovation Counsel LLP (57) ABSTRACT

A recognition method, for recognizing biological characteristic, includes the following: providing a database, wherein the database comprises a plurality of set biological characteristics and a plurality of function relationship between one of the set biological characteristics and a function; capturing, by an electronic device, a to-be-recognized biological characteristic of a user; comparing, by the first electronic device, the to-be-recognized biological characteristic with the set biological characteristics in the database; determining, by the electronic device, whether the to-be-recognized biological characteristic matches a matched one of the set biological characteristics; and when the to-be-recognized biological characteristic matches the matched one of the set biological characteristics, performing, by the electronic device or another electronic device, the function.

12 Claims, 5 Drawing Sheets

(56) References Cited

U.S. PATENT DOCUMENTS

| | | | | |
|---|---|---|---|---|
| 2015/0227740 A1* | 8/2015 | Boshra | .................... | G06F 21/32 |
| | | | | 726/18 |
| 2016/0204948 A1* | 7/2016 | Miller | ................... | H04L 9/0861 |
| | | | | 713/168 |
| 2017/0230362 A1* | 8/2017 | Wang | .................. | H04L 63/0861 |
| 2017/0339141 A1* | 11/2017 | Doyle | ................ | H04L 63/0861 |
| 2020/0233942 A1* | 7/2020 | Ben Bouazza | ......... | G06F 21/32 |
| 2020/0311249 A1* | 10/2020 | Huang | .................... | G06F 21/45 |
| 2021/0240807 A1* | 8/2021 | Wang | ............... | G06Q 20/40145 |
| 2022/0272084 A1* | 8/2022 | Hyatt | ................... | H04W 12/40 |

* cited by examiner

SETUP METHOD, RECOGNITION METHOD AND ELECTRONIC DEVICE USING THE SAME

This application claims the benefit of U.S. provisional application Ser. No. 62/823,678, filed Mar. 26, 2019, and U.S. provisional application Ser. No. 62/845,893, filed May 10, 2019, the subject matters of which are incorporated herein by reference.

TECHNICAL FIELD

The disclosure relates in general to a setup method, a recognition method and an electronic device.

BACKGROUND

Conventional wireless earphone could be electrically connected with an electronic through a wireless communication technology. A user generally operates the wireless earphone by pressing physical button disposed on the wireless earphone. However, such way results in operating modes being limited. Therefore, it has become a prominent task for the industries to increase the flexibility and convenience in operation.

SUMMARY

According to one embodiment, a setup method includes the following steps: setting, by a second electronic device, a function relationship between a set biological characteristic and a function; sensing, by a first electronic device, the set biological characteristic; and storing, by the second electronic device, the set biological characteristic and the function relationship in a database.

According to another embodiment, a recognition method, for recognizing biological characteristic, includes the following: providing a database, wherein the database comprises a plurality of set biological characteristics and a plurality of function relationship between one of the set biological characteristics and a function; capturing, by a first electronic device, a to-be-recognized biological characteristic of a user; comparing, by the second electronic device, the to-be-recognized biological characteristic with the set biological characteristics in the database; determining, by the second electronic device, whether the to-be-recognized biological characteristic matches a matched one of the set biological characteristics; and when the to-be-recognized biological characteristic matches the matched one of the set biological characteristics, performing, by the first electronic device or the second electronic device, the function.

According to an alternative embodiment, an electronic device includes a sensor and a storing unit. The sensor is configured to sense a set biological characteristic. The storing unit is configured to store the set biological characteristic and a function relationship between the set biological characteristic and a function in a database.

According to an alternative embodiment, an electronic device, for recognizing biological characteristic, includes a setting unit, a storing unit and a processor. The setting unit is configured to a function relationship between a set biological characteristic and a function. The storing unit is configured to store database, wherein the database comprises a plurality of the set biological characteristics and a plurality of the function relationships between the set biological characteristics and a plurality of functions. The processor is configured to: compare a to-be-recognized biological characteristic of a user with the set biological characteristics in the database; determine whether the to-be-recognized biological characteristic matches a matched one of the set biological characteristics; and perform the function.

The above and other aspects of the disclosure will become better understood with regard to the following detailed description of the preferred but non-limiting embodiment(s). The following description is made with reference to the accompanying drawings.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Figure 1:
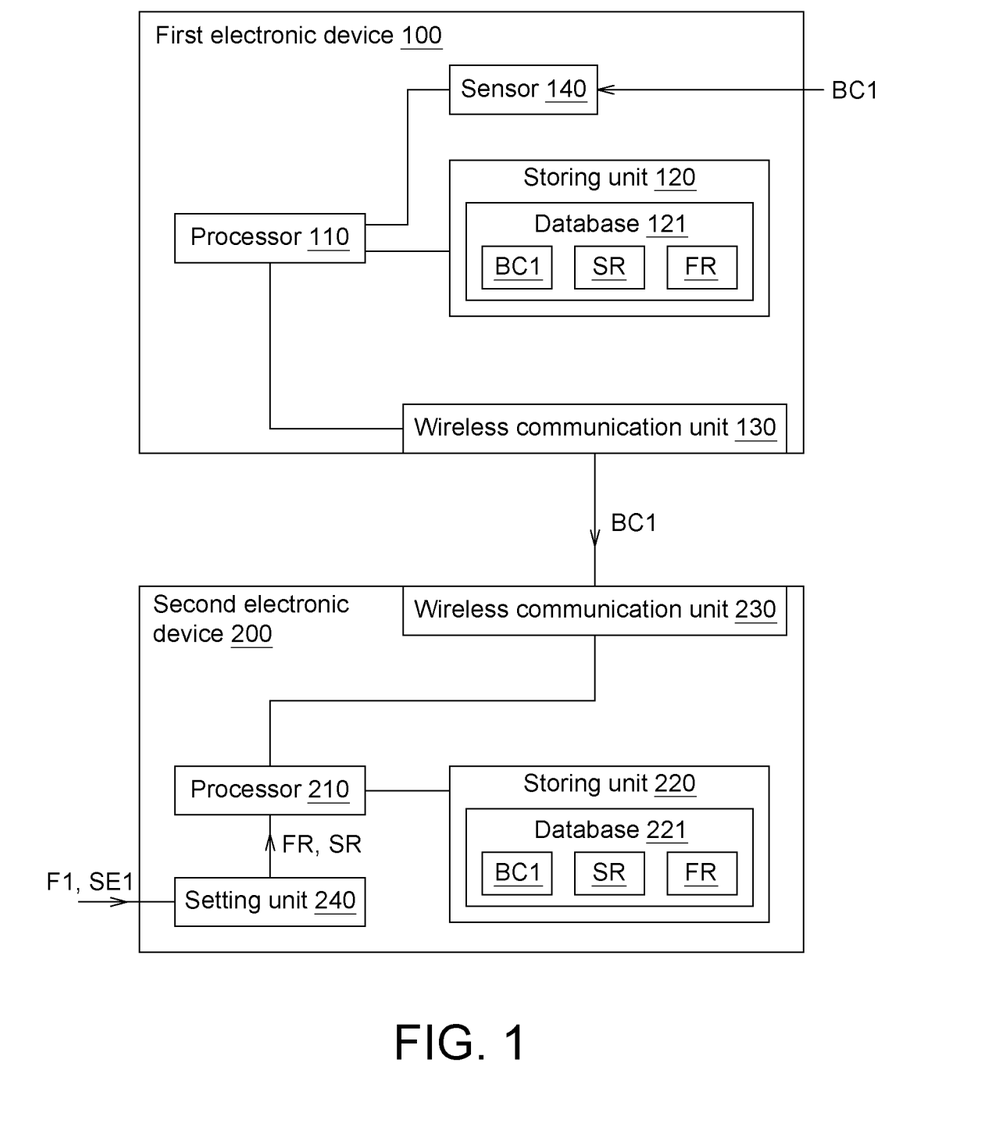
FIG. 1 illustrates a functional block diagram of a recognition system according to an embodiment of the present disclosure.

Refer to FIG. 1. FIG. 1 illustrates a functional block diagram of a recognition system 10 according to an embodiment of the present disclosure.

The recognition system 10 includes a first electronic device 100 and a second electronic device 200. The first electronic device 100 is, for example, one of a cell phone, a tablet, a notebook, iPod, an earphone, a headset, a charging box, or wearable device, such as bracelet, watch, etc., and the second electronic device 200 is, for example, another of the cell phone, the tablet, the notebook, the iPod, the charging box, a wearable device, such as bracelet, watch, etc. or an electronic device that could perform payment function or playing music function. In the present embodiment, the first electronic device 100 is, for example, earphone, and the second electronic device 200 is, for example, cell phone.

The first electronic device 100 includes a processor 110, a storing unit 120, a wireless communication unit 130 and a sensor 140. The second electronic device 200 includes a processor 210, a storing unit 220, a wireless communication unit 230 and a setting unit 240. In another embodiment, the setting unit 240 could be disposed on the first electronic device 100.

At least one of the storing unit 120, the wireless communication unit 130 and the sensor 140 is, for example, circuit structure, chip and/or semiconductor package, which could be formed by using one or some of semiconductor processes. In addition, at least two of the storing unit 120, the wireless communication unit 130 and the sensor 140 could be integrated into one component or one processor. At least one of the storing unit 220, the wireless communication unit 230 and the setting unit 240 is, for example, circuit structure, chip and/or semiconductor package, which could be formed by using one or some of semiconductor processes. In addition, at least two of the storing unit 220, the wireless communication unit 230 and the setting unit 240 could be integrated into one component or one processor.

Figure 2:
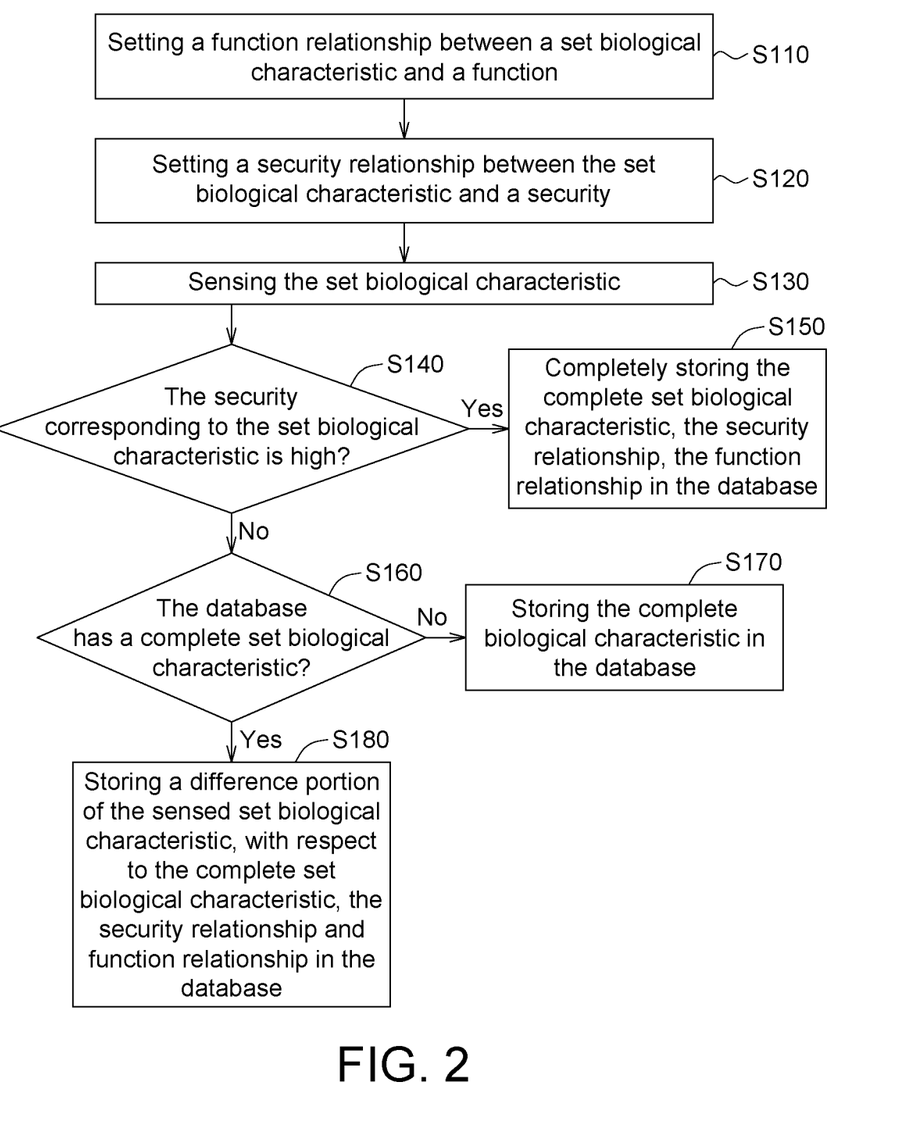
FIG. 2 illustrates a flow chart of a setup method of the recognition system according to an embodiment of the present disclosure.

Refers to FIGS. 1 and 2, FIG. 2 illustrates a flow chart of a setup method of the recognition system 10 according to an embodiment of the present disclosure.

In step S110, the setting unit 240 sets a function relationship FR between a set biological characteristic BC1 and a function F1. In an embodiment, the set biological characteristic BC1 is, for example, fingerprint, and the function F1 is, for example, an operating function for the second electronic device 200. The operating function is, for example, playing function for music or image, such as play/stop, call active/reject, previous/next, volume up/down and more MMI (Multi Media Interface) application in Bluetooth/Wi-Fi Audio application, etc. The operating function further includes function of waking up the second electronic device 200, power on/off the second electronic device 200, etc. In addition, the operating function further includes function of switching the electronic devices, for example, switching the connection to different electronic device.

However, such exemplification is not meant to be for limiting.

In addition, user could input the set biological characteristic BC1 and the function F1 through a user interface (not illustrated), and the setting unit 240 sets the function relationship FR between the set biological characteristic BC1 and the function F1 according to the inputs of the user interface. The user interface is, for example, a window, displayed in a display device (not illustrated) of the first electronic device 100 or the second electronic device 200.

In step S120, the setting unit 240 sets a security relationship SR between the set biological characteristic BC1 and a security SE1.

In addition, user could input the set biological characteristic BC1 and the security SE1 through the user interface, and the setting unit 240 sets the security relationship SR between the set biological characteristic BC1 and the security SE1 according to the inputs of the user interface.

In step S130, the sensor 140 senses the set biological characteristic BC1 of the user. For example, the sensor 140 senses a fingerprint of the user, such as at one of little finger, ring finger, middle finger, forefinger and thumb. Alternatively, the set biological characteristic BC1 also could be a combo key or a key combination. For example, the sensor 140 senses a number of the fingerprints of the user, such as at least two of little finger, ring finger, middle finger, forefinger and thumb. In addition, the set biological characteristic BC1 could be a finger movement of one finger or several fingers, such as a slide, click, double-click, etc. Different set biological characteristic BC1 could represent different function F1.

In step S140, the processor 110 or 210 determines whether the security SE1 corresponding to the set biological characteristic BC1 is high security level. When the security SE1 corresponding to the set biological characteristic BC1 is high security level, the processes proceeds to step S150; If not, the processes proceeds to step S160.

In step S150, the processor 110 or 210 completely stores the set biological characteristic BC1, the security relationship SR and the function relationship FR in the database 121 disposed on the storing unit 120.

In step S160, the processor 110 or 210 determines whether the database 221 or 121 has a complete set biological characteristic BC1' (not illustrated in figure). When the database 221 or 121 has the complete set biological characteristic BC1', the process proceeds to step S180; if not, the process proceeds to step S170.

If the sensing in step S130 is initial/first sensing, generally there is no any set biological characteristic BC1 stored in the database, or there is no any complete set biological characteristic BC1' stored in the database 221 or 121. Thus, the process proceeds to step S170, the processor 110 stores the complete set biological characteristic BC1 (as the complete set biological characteristic BC1') in the database 221 or 121.

In step S180, when the database 221 or 121 has the complete set biological characteristic BC1', the processor 110 or 210 could store a difference portion of the sensed set biological characteristic BC1 with respect to the complete set biological characteristic BC1' in the database 221 or 121. The set biological characteristic BC1 could be identified/recognized by the difference portion of the sensed set biological characteristic BC1.

Figure 3A:
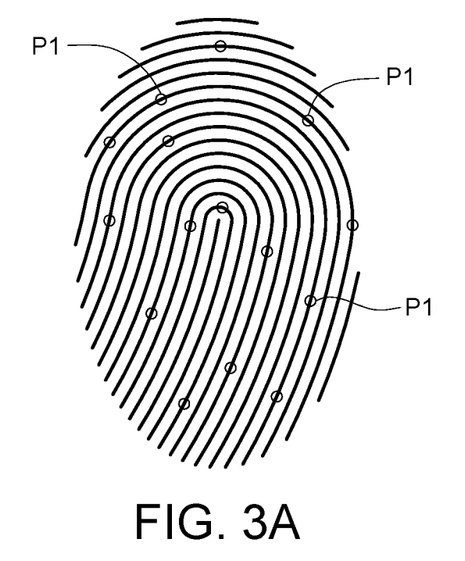
FIG. 3A illustrates a schematic diagram of the complete set biological characteristic.
Figure 3B:
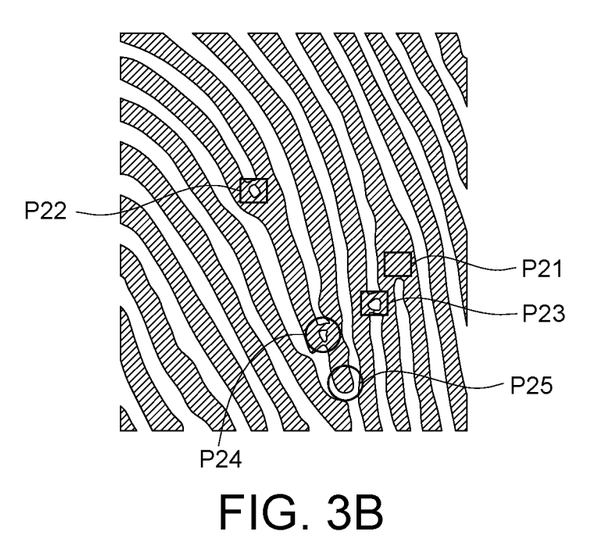
FIG. 3B illustrates a schematic diagram of the sensed set biological characteristic.

As illustrated in FIGS. 3A and 3B, FIG. 3A illustrates a schematic diagram of the complete set biological characteristic BC1', and FIG. 3B illustrates a schematic diagram of the sensed set biological characteristic BC1. As illustrated in FIG. 3A, the complete set biological characteristic BC1' has a number of characteristic points P1. Since the sensed set biological characteristic BC1 could be recognized by a difference portion (such as, characteristic points P21 to P25 illustrated in FIG. 3B) of the sensed set biological characteristic BC1, only the difference portion of the sensed set biological characteristic BC1 is allowed to be stored in the database 121 or 221. As a result, the setting speed for the function relationship FR and the security relationship SR, and recognizing speed for the recognizing processes described below could be increased.

As described above, the set of the function relationship FR, the security relationship SR and the set biological characteristic BC1 is stored in the database 221 according to steps S110 to S180. In addition, the set of the function relationship FR, the security relationship SR and the set biological characteristic BC1 could be stored in the database 121 disposed in the storing unit 220 of the second electronic device 200 through the wireless communication units 130 and 230. The wireless communication technology used by the wireless communication units 130 and 230 is, for example, Bluetooth communication technology, Wi-Fi communication technology, etc.

Figure 4A:
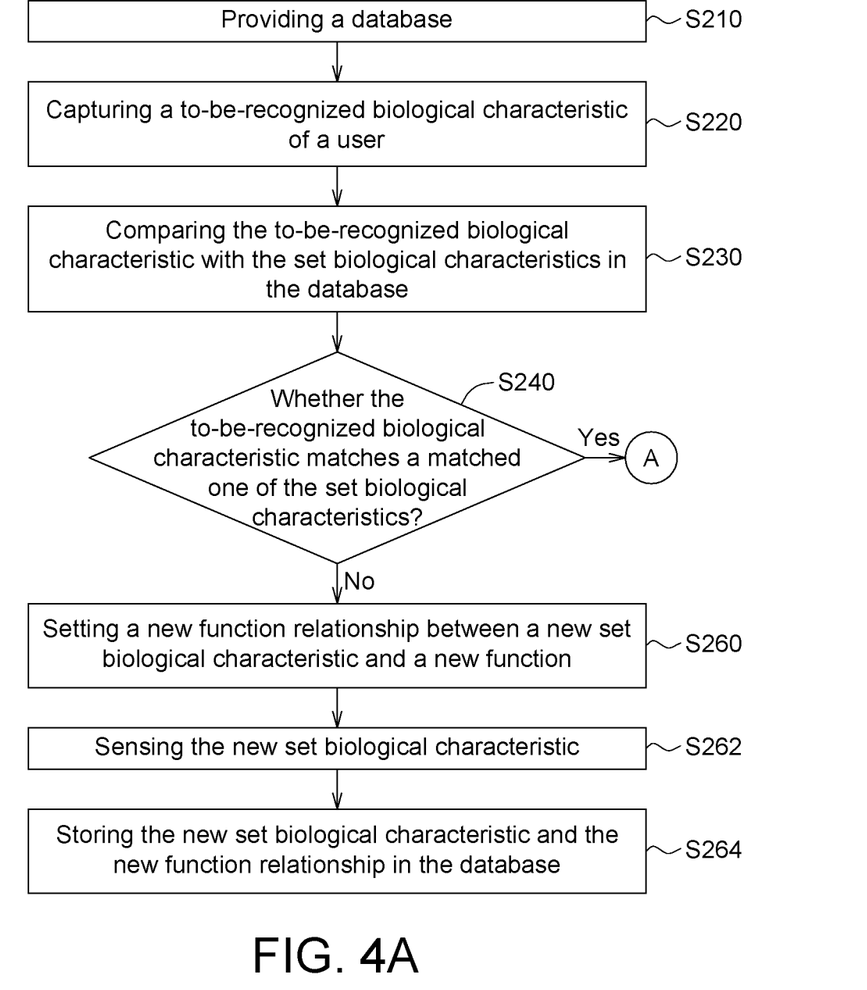
FIGS. 4A and 4B illustrate a flow chart of a recognition method of the recognition system according to an embodiment of the present disclosure.
Figure 4B:
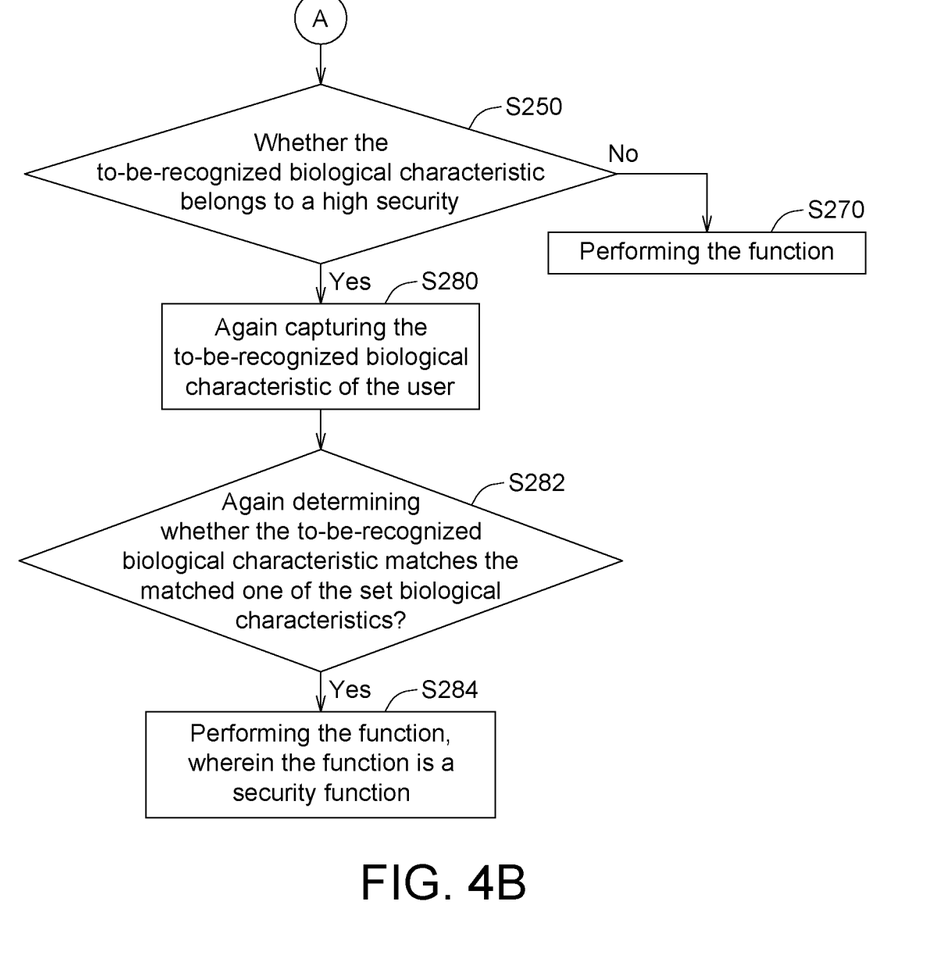

Refer to FIGS. 4A and 4B. FIGS. 4A and 4B illustrate a flow chart of a recognition method of the recognition system 10 according to an embodiment of the present disclosure.

In step S210, the first electronic device 100 provides the database 121 or the second electronic device 200 provides the database 221, wherein the database 121 or 221 includes a number of the set biological characteristics BC1, a number of the function relationship FR and a number of the security relationship SR, wherein each function relationship FR represents the relationship between one set biological characteristics BC1 and one function F1, and each security relationship SR represents the relationship between one set biological characteristics BC1 and one security SE1.

In step S220, the sensor 140 of the first electronic device 100 captures a to-be-recognized biological characteristic TC (not illustrated in figure) of the user.

In step S230, the processor 110 or 210 compares the to-be-recognized biological characteristic TC with the set biological characteristics BC1 in the database 121 or 221.

In step S240, the processor 110 or 210 determines whether the to-be-recognized biological characteristic TC matches a matched one of the set biological characteristics BC1. When the to-be-recognized biological characteristic TC matches the matched one of the set biological characteristics BC1, the process proceeds to step S250. If not, the process proceeds to step S260.

In step S250, the processor 110 or 210 determines whether the to-be-recognized biological characteristic TC belongs to a lower security level. When the to-be-recognized biological characteristic belongs to the lower security level, the process proceeds to step S270. If not, the process proceeds to step S280.

In step S270, the processor 110 or 210 performs the function F1 corresponding to the to-be-recognized biological characteristic TC according to the function relationship FR of the matched one of the set biological characteristics BC1 and the corresponding function F1.

In step S280, the processor 110 or 210 again captures the to-be-recognized biological characteristic TC of the user for double check.

In step S282, the processor 110 or 210 again determines whether the complete to-be-recognized biological characteristic TC matches the matched one of the complete set biological characteristics BC1 belonging to high security level. When the complete to-be-recognized biological characteristic TC matches the matched one of the complete set biological characteristics BC1 belonging to high security level, the process proceeds to step S284.

In step S284, the processor 110 or 210 performs the function F1, wherein the function F1 is, for example, a security certification of a payment. In steps S280 to S284, when the sensing needs high security certification, the sensing could be performed twice, and the to-be-recognized biological characteristic TC is required to be identified/recognized the complete biological characteristic.

In step S260, when the to-be-recognized biological characteristic TC does not match any set biological characteristics BC1 in the database 121 or 221, it means that the to-be-recognized biological characteristic TC has not yet been defined in the database 121 or 221. Thus, the second electronic device 200 could set a new function relationship FR between a new set biological characteristic BC1 and a new function F1.

In step S262, the sensor 140 of the first electronic device 100 senses the new set biological characteristic BC1.

In step S264, the first electronic device 100 stores the new function relationship FR in the database 121 or 221.

As described above, since the recognition system 10 could perform the functions by sensing the biological characteristic without watching the electronic 100, the electronic 100 is allowed to be operated within the pocket of the user.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A recognition method, for recognizing biological characteristic, comprises:
providing a database, wherein the database comprises a plurality of set biological characteristics and a plurality of function relationships between the set biological characteristics and a plurality of functions, wherein the set biological characteristics comprises plurality of different fingerprints and a plurality of different finger movements of one finger or several fingers, different fingerprints or finger movements that are associated with different functions based on the function relationships;
capturing, by a first electronic device, a to-be-recognized biological characteristic of a user;
comparing, by a second electronic device, the to-be-recognized biological characteristic with the set biological characteristics in the database;
determining, by the second electronic device, whether the to-be-recognized biological characteristic matches a matched one of the set biological characteristics; and
when the to-be-recognized biological characteristic matches the matched one of the set biological characteristics, performing, by the first electronic device or the second electronic device, a corresponding function related to the matched one of the set biological characteristics, among the different types of functions, based on a determination of a biological security level associated with the matched one of the set biological characteristics.

2. The recognition method as claimed in claim 1, wherein the set biological characteristic and the to-be-recognized biological characteristic are fingerprints.

3. The recognition method as claimed in claim 1, further comprising:
determining, by the second electronic device, whether the to-be-recognized biological characteristic belongs to a lower security level; and
when the to-be-recognized biological characteristic belongs to the lower security level, performing, by the first electronic device or the second electronic device, a corresponding function related to the matched one of the set biological characteristics, among different types of the functions.

4. The recognition method as claimed in claim 1, further comprising:
determining, by the second electronic device, whether the to-be-recognized biological characteristic belongs to a high security level;
when the to-be-recognized biological characteristic belongs to the high security level, again capturing, by the first electronic device, the to-be-recognized biological characteristic of the user;
again determining, by the second electronic device, whether the to-be-recognized biological characteristic matches the matched one of the set biological characteristics;
when the to-be-recognized biological characteristic matches the matched one of the set biological characteristics after again determining, performing, by the first electronic device or the second electronic device, a corresponding function related to the matched one of the set biological characteristics, among different types of the functions, wherein the function to be performed is related to a security certification of a payment.

5. The recognition method as claimed in claim 1, further comprising:
when the to-be-recognized biological characteristic does not match any of the set biological characteristics, performing the following steps:
setting, by the second electronic device, a new function relationship between a new set biological characteristic and a new function;

sensing, by the first electronic device, the new set biological characteristic; and storing, by the second electronic device, the new set biological characteristic and the new function relationship in the database.

6. The recognition method as claimed in claim 1, wherein the first electronic device is an earphone or a charging box, and the second electronic device is a cell phone, a tablet, a notebook laptop or an iPod.

7. An electronic device for recognizing biological characteristic, comprises:

a setting unit, configured to set a plurality of function relationships between a plurality of set biological characteristics and a plurality of functions;

a storing unit, configured to store a database, wherein the database comprises the set biological characteristics and the function relationships between the set biological characteristics and the functions, wherein the set biological characteristics comprise a plurality of different fingerprints and a plurality of different finger movements of one finger or several fingers, different fingerprints or finger movements that are associated with different functions based on the function relationships;

a processor, configured to:
  compare a to-be-recognized biological characteristic of a user with the set biological characteristics in the database;
  determine whether the to-be-recognized biological characteristic matches a matched one of the set biological characteristics; and
  perform a corresponding function related to the matched one of the set biological characteristics, among the different types of functions, based on a determination of a biological security level associated with the matched one of the set biological characteristics.

8. The electronic device as claimed in claim 7, wherein the set biological characteristic and the to-be-recognized biological characteristic are fingerprints.

9. The electronic device as claimed in claim 7, further the processor is further configured to:
  determine whether the to-be-recognized biological characteristic belongs to a lower security level; and
  perform a corresponding function related to the matched one of the set biological characteristics, among different types of the functions, when the to-be-recognized biological characteristic belongs to the lower security level.

10. The electronic device as claimed in claim 7, the processor is further configured to:
  determine whether the to-be-recognized biological characteristic belongs to a high security level;
  again capture the to-be-recognized biological characteristic of the user when the to-be-recognized biological characteristic belongs to the high security level;
  again determine whether the to-be-recognized biological characteristic matches the matched one of the set biological characteristics;
  perform a corresponding function related to the matched one of the set biological characteristics, among different types of the functions, when the to-be-recognized biological characteristic matches the matched one of the set biological characteristics after again determining; wherein the function to be performed is related to a security certification of a payment.

11. The electronic device as claimed in claim 7, the processor is further configured to:
  perform the following steps when the to-be-recognized biological characteristic does not match any of the set biological characteristics:
  set a new function relationship between a new set biological characteristic and a new function;
  sense the new set biological characteristic; and
  store the new set biological characteristic and the new function relationship in the database.

12. The electronic device as claimed in claim 7, wherein the electronic device is a cell phone, a tablet, a notebook laptop, iPod, an earphone or a charging box.

* * * * *